United States Patent [19]
Chen et al.

[11] Patent Number: 5,592,683
[45] Date of Patent: Jan. 7, 1997

[54] SYSTEM FOR SELECTIVELY PROCESSING NESTED PRINT COMMANDS AND BUFFERED POST-PRINT COMMANDS THEREAFTER AND RESENDING SELECTED PORTION OF DATA STREAM UPON ERROR DETECTION

[75] Inventors: Weilin Chen; James W. Marlin, both of Longmont; Ronald D. Parrish, Niwot; Frankie S. Shook; David E. Stone, both of Longmont, all of Colo.

[73] Assignee: IBM Corporation, Armonk, N.Y.

[21] Appl. No.: 210,782

[22] Filed: Mar. 18, 1994

[51] Int. Cl.[6] .............................. G06F 7/14; G06F 11/08
[52] U.S. Cl. .................... 395/872; 364/131; 364/230; 364/232.22; 364/235; 382/309; 395/182.16; 395/185.05; 395/800; 395/825
[58] Field of Search ........................... 395/275, 182.16, 395/185.05, 650, 800, 825, 872; 364/200, 131; 101/144; 382/17, 309; 46/74 ES

[56] References Cited

U.S. PATENT DOCUMENTS

| | | | |
|---|---|---|---|
| 3,698,006 | 10/1972 | Ovshinsky | 46/74 ES |
| 3,771,446 | 11/1973 | Kaneko et al. | 101/144 |
| 4,532,588 | 7/1985 | Foster | 395/650 |
| 4,543,626 | 9/1985 | Bean et al. | 364/200 |
| 4,651,278 | 3/1987 | Herzog et al. | 364/300 |
| 4,932,026 | 6/1990 | Dev et al. | 370/94.1 |
| 4,992,958 | 2/1991 | Kageyama et al. | 364/519 |
| 5,087,979 | 2/1992 | Schaertel | 358/296 |
| 5,335,292 | 8/1994 | Lovelady et al. | 382/17 |

OTHER PUBLICATIONS

"Intelligent Printer Data Stream Buffered Command and Page Pipeline Notations" by W. Chen and D. Stone; IBM Technical Disclosure Bulletin; vol. 36, No. 3, Mar., 1993.

*Primary Examiner*—Thomas C. Lee
*Assistant Examiner*—Po C. Huang
*Attorney, Agent, or Firm*—Homer L. Knearl; Saul A. Seinberg

[57] ABSTRACT

A printing system wherein pre-printing commands, print data, and post-printing commands are nested in a data stream, the commands bounding a group of print data pages in the data stream, the group of pages containing one or more page data blocks, and the commands defining one or more operations to be performed relative to the group of pages. Groups of pages are handled in accordance with the commands in the data stream, and the commands are buffered while a print processor processes the group of pages to form printed sheets therefrom.

6 Claims, 11 Drawing Sheets

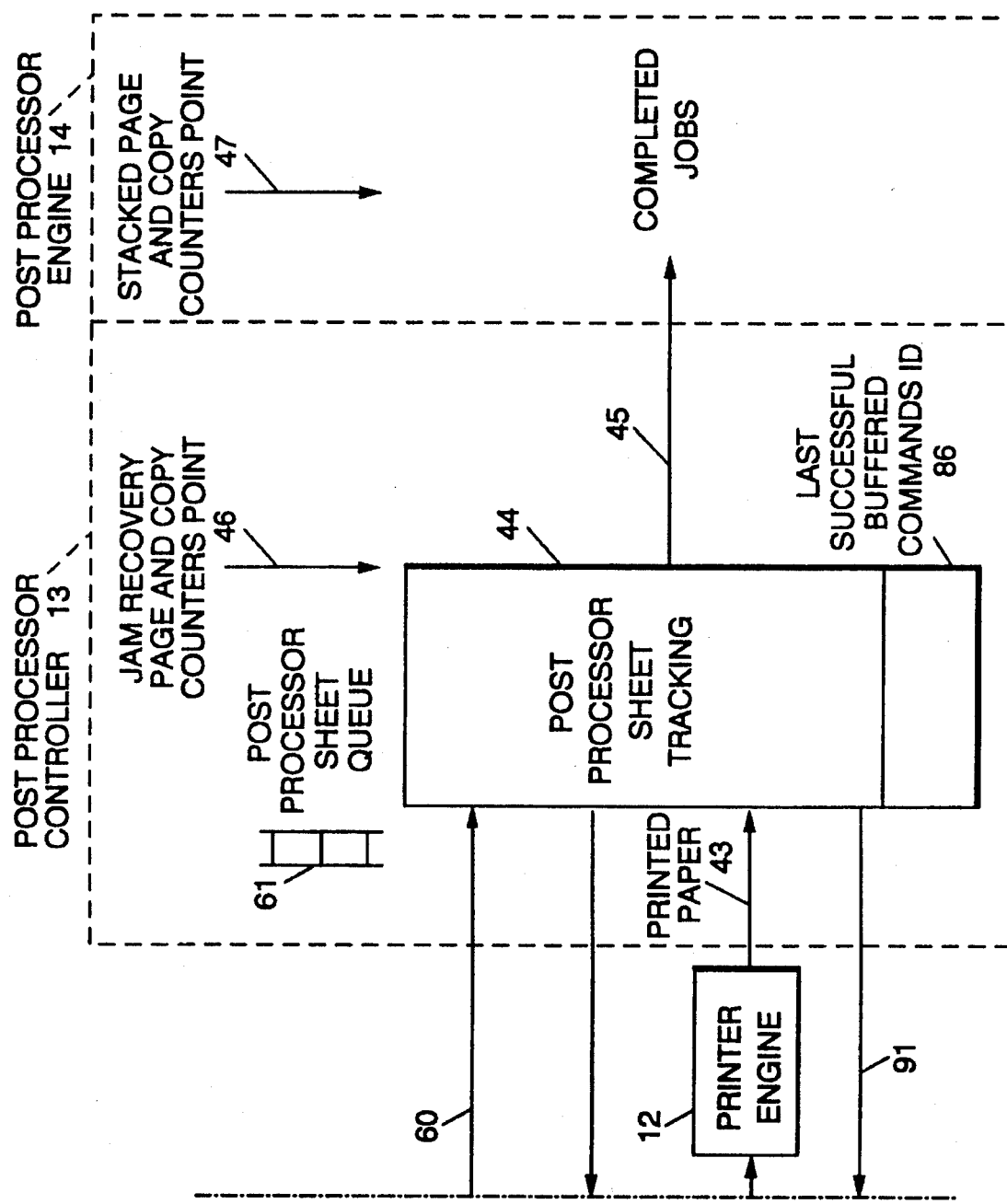

LOGICAL
SHEET 19

FRONT SIDE
BITMAP

BACK SIDE
BITMAP

BUFFERED
COMMANDS

FIG. 2A

POST PROCESSOR
LOGICAL SHEET 20

BUFFERED
COMMANDS

FIG. 2B

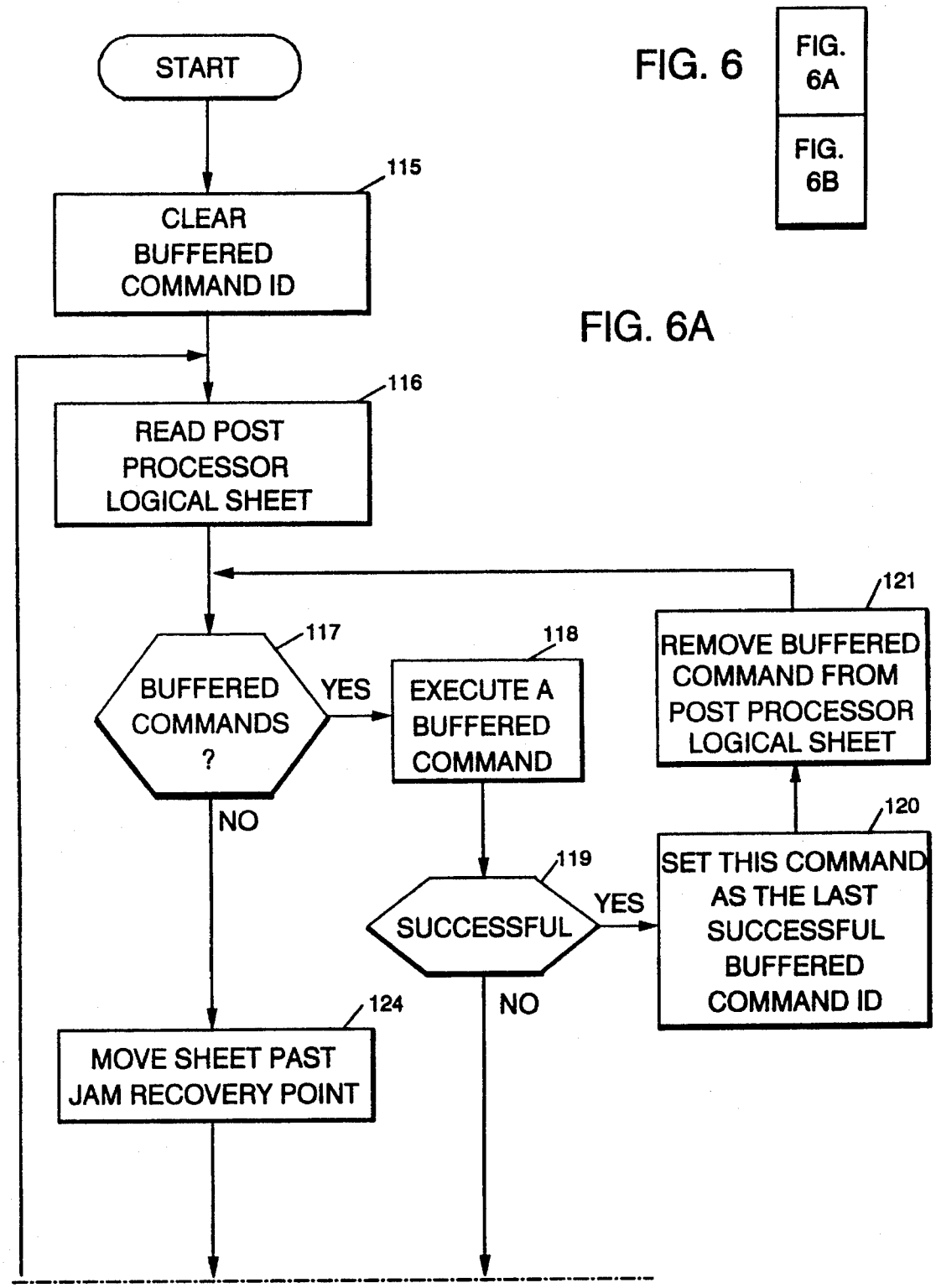

SYSTEM FOR SELECTIVELY PROCESSING NESTED PRINT COMMANDS AND BUFFERED POST-PRINT COMMANDS THEREAFTER AND RESENDING SELECTED PORTION OF DATA STREAM UPON ERROR DETECTION

BACKGROUND OF THE INVENTION

1. Field of the Invention:

This invention pertains to the field of information processing system organization, and more specifically to buffering functions that relate to the production of printed sheets that are electrically defined by a data stream that is supplied as an input to a data processing printer system.

2. Description of the Prior Art:

The art has addressed the problem of providing control of a data processing printer in a number of different manners.

U.S. Pat. No. 4,651,278, incorporated herein by reference, describes an interface process for an all points addressable printer. The process described in this patent is known commercially as Intelligent Printer Data Stream (IPDS, a trademark of International Business Machines Corporation). IPDS provides a structured field data stream that is designed to manage and control printer processes by allowing both data and commands to be passed to the printer using the data stream. This process enables the transmission of commands and data from a host application to the printer in a manner that is independent of the communication means and the transmission protocol. In a first state condition of the process, the application issues device control commands, provides data for controlling basic device operations, and enables the construction of logical pages, all of which is packaged into the communications protocol. In a second state condition of the process, the application issues presentation control commands and provides data for controlling the presentation of data on a logical page, all of which is packaged within the data field of the communication protocol. The data field of the communication protocol is used by the printer, in either the first or the second state condition, to provide response acknowledgement data from the printer to the application. Reference may also be made to the manual *IPDS Reference Data Stream and Object Architectures*, S 544–3417, for a description of the architecture of IPDS.

The *IBM Technical Disclosure Bulletin*, Vol. 36, No. 3, March 1993, at pages 157–158, describes an IPDS having buffered command and page pipeline notations of the general type used herein.

U.S. Pat. No. 4,992,958 describes a printer controller arrangement wherein a command buffer unit stores a command series that contains a drawing command and a printing command. A page buffer unit stores a plurality of pages to be printed. A task process unit executes the drawing commands and the printing commands. A task control unit is provided to control the task process unit.

U.S. Pat. No. 5,087,979 describes a printing system providing a print function and post-print functions. A buffer memory of limited storage capacity is provided. This buffer memory receives job control information over a communications link, and receives image data over an image data bus. The post-print and/or print functions are adjusted when the capacity of the buffer memory is exceeded.

While the art has generally developed in a satisfactory manner, as above exemplified, a need remains for a printer system wherein pre-print commands, print data, and post-print commands can be nested into a single data stream that is provided to the printer system.

SUMMARY OF THE INVENTION

This invention provides a printer system wherein pre-print commands, print data, and post-print commands are nested into a single data stream that is provided from a host processor to the printer system (for example, see print system manager 10 and IPDS commands 16 of FIG. 1A).

The invention will be described while making reference to the use of what is known as the Intelligent Printer Data Stream (IPDS, see above-mentioned U.S. Pat. No. 4,651, 278). However, the spirit and scope of the invention is not to be limited thereto. More generally, the invention provides data flow, buffering, and error recovery in a printer system wherein pre-print commands, print data, and post-print commands are nested into a single data stream.

The following terminology will be used herein to describe preferred embodiments of the invention.

The terms "pre and post processing functions" relate to the processing of print media (for example, sheets of paper) that is feeding into, or flowing out of, a printer. Examples of such functions are hole punching, bursting, and shrink wrapping, also known generally as advanced finishing functions.

The term "virtual pipeline" relates to a logical view of the path that pages and buffered commands flow through in a printer system (for example, see 18,19,20,21 of FIG. 1A).

The term "buffered commands" relates to non-page building commands that have been received by the printer system from the host, which commands have not as yet been executed by the printer system. Two examples are IPDS commands XOH-DGB, "execute order homestate-define group boundary", and XOH-SGO "execute order homestate-select group operation". Buffered commands travel in a virtual sheet pipeline that contains a plurality of logical sheets, each sheet having, for example, a front side bit map, a back side bit map, and buffered commands (for example, see build sheet queue 18 of FIG. 1A). Buffered commands travel in, or with, a logical sheet prior to printing of one or more pages on a sheet. After printing, the buffered commands continue to travel in the virtual sheet pipeline as logical sheets, wherein the logical sheets in the virtual sheet pipeline track movement of the printed sheets, until such time as the buffered commands are executed (see post processor sheet queue 61 of FIG. 1B, for example).

The term "buffered command ID" relates to an identifier of a buffered command and identifies whether or not a buffered command has been executed (see the last successful buffered command ID register 86 of FIGS. 1B and 10, for example).

The term "immediate commands" are IPDS commands that are executed immediately as they are received by the printer system. After execution, these commands are discarded. (Examples are "load copy control" and "logical page position".)

The term "copy counter" (for example, see FIG. 10) comprises the bytes in a receiver-to-sender acknowledgement reply (for example, the output of synchronize error recovery 85 that is sent to print system manager 10 of FIG. 1A) that identifies the number of copies of pages that have passed a particular point (for example, see points 41, 48, 46 and 47 of FIG. 1) in a virtual command pipeline.

The term "page counter" comprises the bytes in a receiver-to-sender acknowledgement reply that identify the number of pages that have passed a particular point in a virtual command pipeline.

IPDS architecture does not have the capability of supporting the inclusion of pre and post processing commands in its virtual IPDS command pipeline. Thus, such commands have no way of flowing from the host to the printer system. These commands cannot be included into the IPDS page-state commands because the commands are not page-building commands. These commands cannot be considered immediate IPDS commands, since pre and post processing commands have to be buffered, and then processed by a device in the printer system that is capable of executing the requested command function as the commands flow through the virtual pipeline.

In the prior IPDS architecture, when an error is detected by the printer system, the upstream commands from the point of error are cleared, and are later resent by the host. When the IPDS data stream also includes pre and post processing commands, as provided by the present invention, there is a need to identify which of these commands should be resent during error recovery in a virtual command pipeline.

The present invention accomplishes this function by the use of IPDS commands that have the features of command buffering and command tracking. These IPDS commands are buffered within the IPDS command stream, and they are processed by pre and/or post processor engines as these IPDS commands flow through the virtual pipeline. A buffered command ID is introduced within each such buffered command. The last successfully executed buffered command is included within sense code that is reported to the host by the printer system when an error occurs in the printer system (for example, see the output of synchronize error recovery 85 of FIG. 1A). This buffered command ID identifies the most recently successfully executed buffered command that was processed by the printer system since the beginning of a defined work unit or dataset, up until the time that the error occurred. The host uses this buffered command ID to determine which buffered commands are to be subsequently resent to the printer system during error recovery.

These and other features and advantages of the invention will be apparent to those of skill in the art upon reference to the following detailed description, which description makes reference to the drawing.

BRIEF DESCRIPTION OF THE DRAWING

FIG. 2 comprises FIGS. 2A and 2B. FIG. 2A shows the bit map and buffered command structure of a logical sheet as it exists in the build sheet queue of the virtual pipeline of the printer controller of FIG. 1. FIG. 2B shows the buffered command structure of a logical sheet as it exists in the post processor sheet queue of the virtual pipeline of the post processor controller of FIG. 1.

DETAILED DESCRIPTION OF THE PREFERRED EMBODIMENTS

Figure 1A:
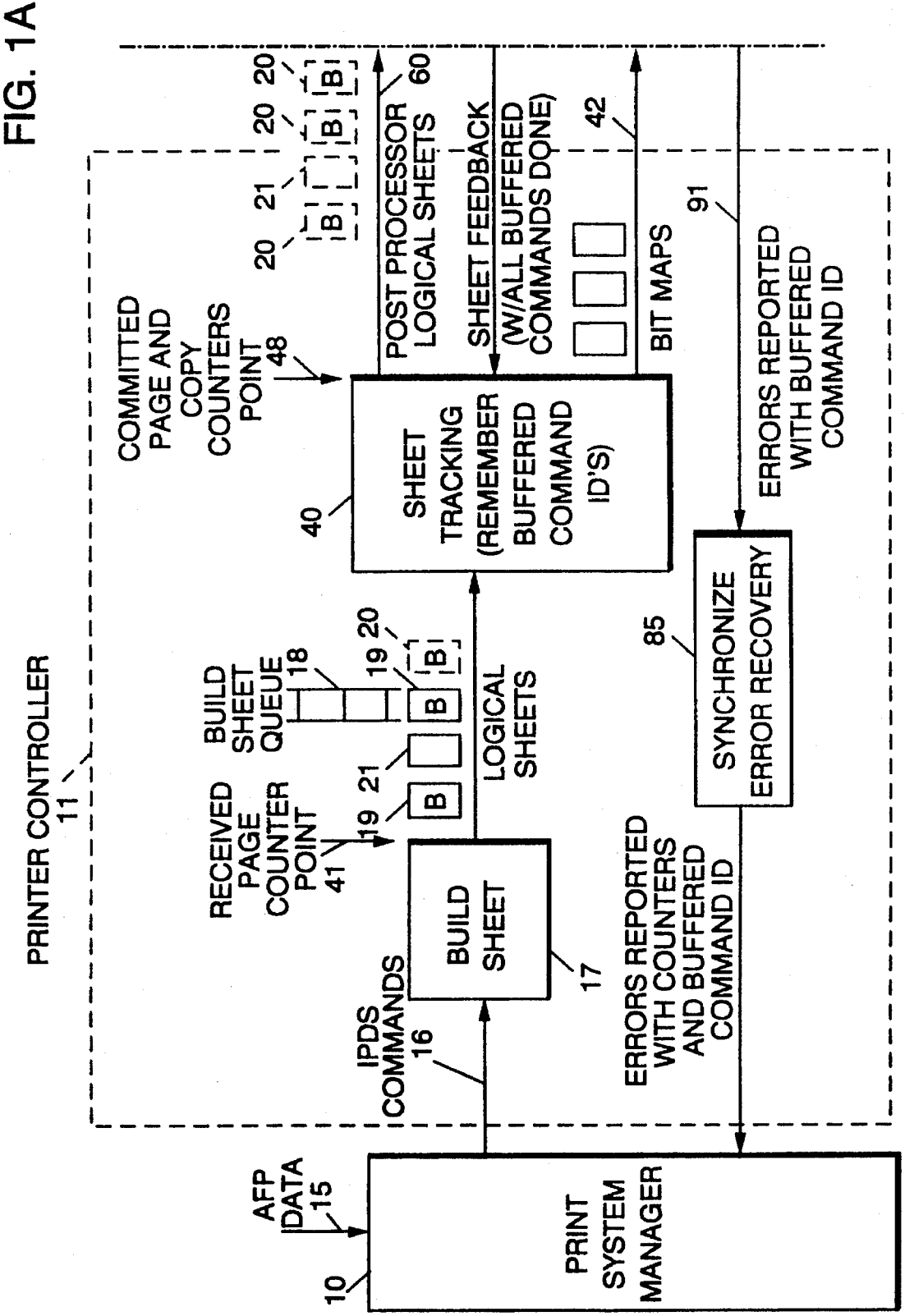
FIG. 1 comprised of FIGS. 1A and 1B is a system diagram of a printer system in accordance with the invention, the system comprising a print system manager, a printer controller, a printer engine, a post processor controller, and a post processor engine.

This invention provides a printer system wherein pre-print commands, print data, and post-print commands are nested into a single IPDS command stream that is provided from a host processor to the printer system.

FIG. 1 is a diagram of a printer system in accordance with the invention, the system comprising a print system manager 10, a printer controller or control unit 11, a printer engine 12, a post processor controller or control unit 13, and a post processor engine 14. A host processor (not shown) provides an input Advanced Function Printing (AFP) data stream 15 to print system manager 10. Print system manager 10 operates on this AFP data stream in the well-known manner to provide therefrom IPDS commands 16 as an input to build sheet device or function 17.

A typical IPDS data stream, or data set 16 (to be described in detail later) in accordance with the invention, is as follows wherein the convention is to read this IPDS data stream right to left:

$\{_8(_7\ 8_3<_6\ 7_3\ 6_2>_5\ 5_3)_4(_3\ 4_2\ 3_3\ 2_3\ 1_3)_2\}_1\ Op_\{Op_<Op_($ wherein the notation $4_2$ indicates that page 4 has two copies, the notations $\{(<\ >)\}$ indicate group boundaries of the data set, the notation $\{_8$ indicates that this is the eighth buffered command in the dataset, and the notations $Op_\{$, $Op_<$, and $Op_($ indicate three group operations that are requested in the data set. In this data set, the operation $Op_\{$ is to be on the entire set of eight pages, whereas the operation $Op_<$ is to be performed on only pages six and seven of the set of eight pages.

The invention provides extensions to the well-known AFP/IPDS processes, these extensions enabling the user to request pre and/or post processing functions to be performed on the media input to, and/or the media output from, the printer system of FIG. 1.

As used herein, a finishing operation performs a function on the media output of a printer system. An example of such media, without limitation thereto, are individual paper sheets and form fold paper web. Examples of such finishing functions, without limitation thereto, are stapling, punching, shrink wrapping, and banding. In the pre/post processing environment, other operations may be associated with the input/output media, such as delivery methods, accounting, and input media selection.

Build sheet function/device 17 of FIG. 1 operates to build logical sheets of the type shown in FIG. 2A from IPDS commands 16, and then places these logical sheets in build sheet queue 18. The output of build sheet device 17 is designated in FIG. 1 as received sheet point 41. Logical sheets 19 of FIG. 1 are logical sheets that have both buffered commands and bit maps as shown in FIG. 2A, logical sheets 20 of FIG. 1 are logical sheets that have only buffered commands as shown in FIG. 2B, and logical sheets 21 of FIG. 1 are logical sheets that have neither bit maps nor buffered commands.

Sheet tracking function or device 40 operates to form a bit map stream 42 and a stream of post processor logical sheets 60 from build sheet queue 18. The output of sheet tracking function 40 is designated as committed sheet point 48.

Post processor logical sheets 60 are presented to post processor sheet queue where these logical sheets, comprising logical sheets 20 with only buffered commands and/or logical sheets 21 with neither buffered commands or bit maps await processing by post processor controller 13 and post processor engine 14.

Figure 7:
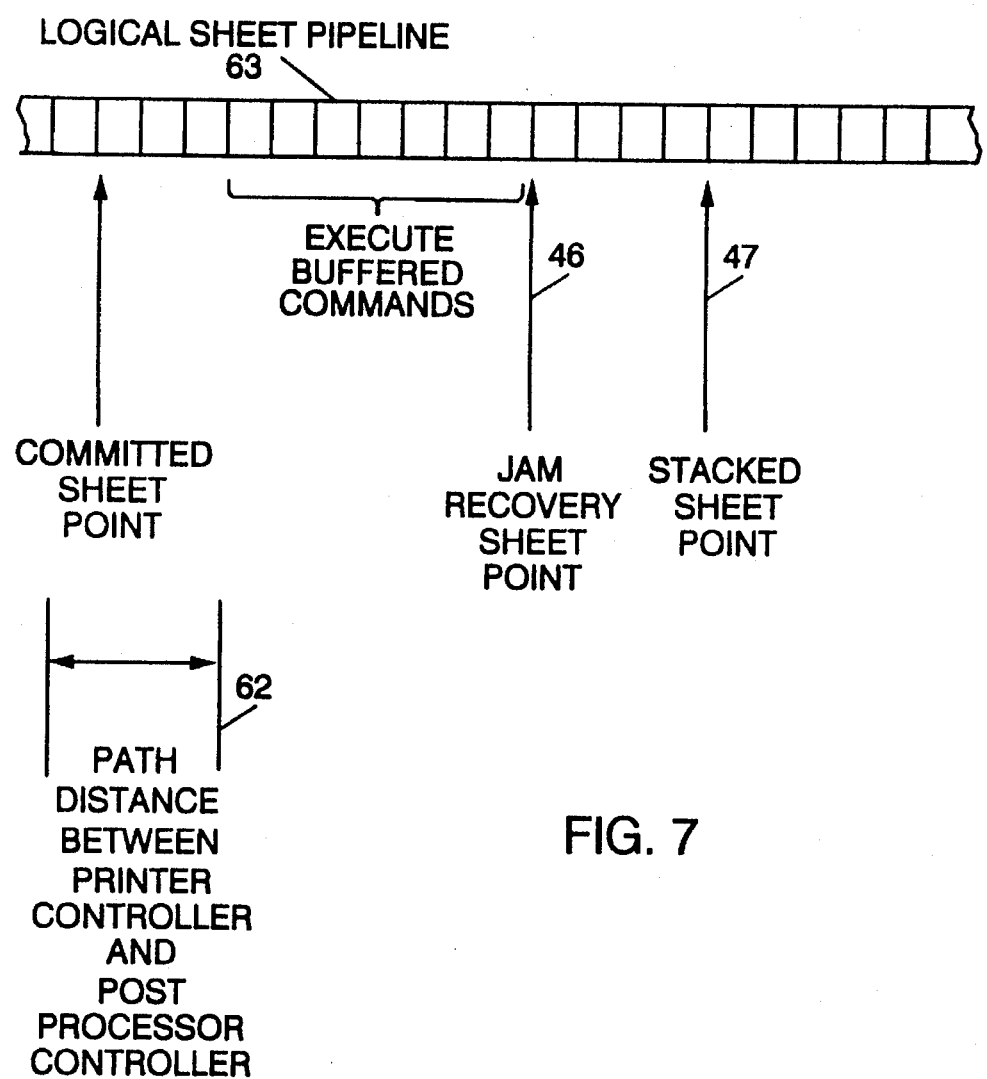
FIG. 7 shows the logical sheet pipeline that includes the post processor sheet queue and extends between the committed sheet point and the stacked sheet point of FIG. 1.

FIG. 7 shows the logical sheet pipeline that includes post processor sheet queue 61 of FIG. 1B, and extends between committed sheet point 48 and stacked sheet point 47 of FIG. 1. As is shown in FIG. 7, the buffered commands of logical sheets 20 in post processor sheet queue 61 are executed at 63 in the logical sheet pipeline after the output point 62 of printer engine 12 and before jam recovery point 46.

According to FIG. 1, Bit maps 42 are presented as an input to printer engine 12, whereupon sheets are printed in accordance with the bit maps, and the sheets are presented as physical sheets of printed paper 43 to the input of post processor sheet tracking function 44. Completed print jobs, including the requested post processing of physical sheets 43, are presented as completed jobs to work flow path 45. The input to completed jobs work flow path 45 is designated as jam recovery sheet point 46, whereas the output of completed jobs work flow path 45 is designated as stacked sheet point 47.

Figure 4:
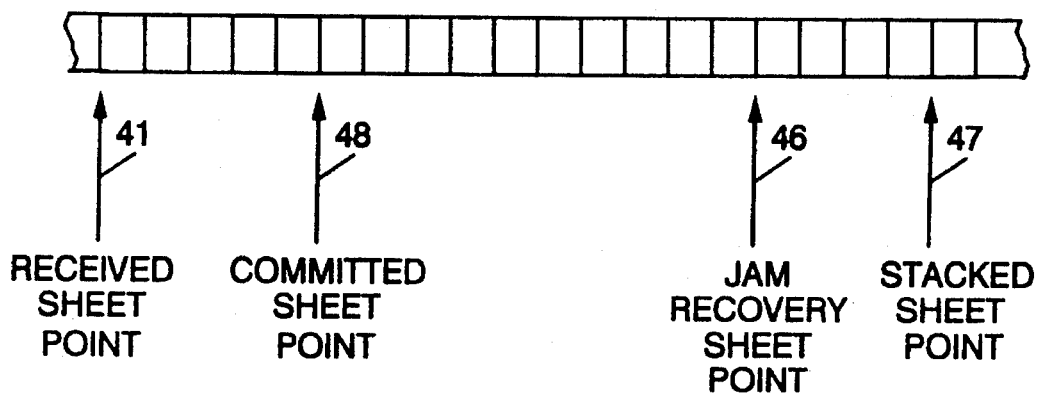
FIG. 4 shows the sheet tracking pipeline that includes the build sheet queue and extends between the received sheet point and the stacked sheet point of FIG. 1.

FIG. 4 shows the sheet tracking pipeline that is monitored by sheet tracking function 40 of FIG. 1, includes build sheet queue 18, and extends between received sheet point 41 and stacked sheet point 47 of FIG. 1.

Figure 10:
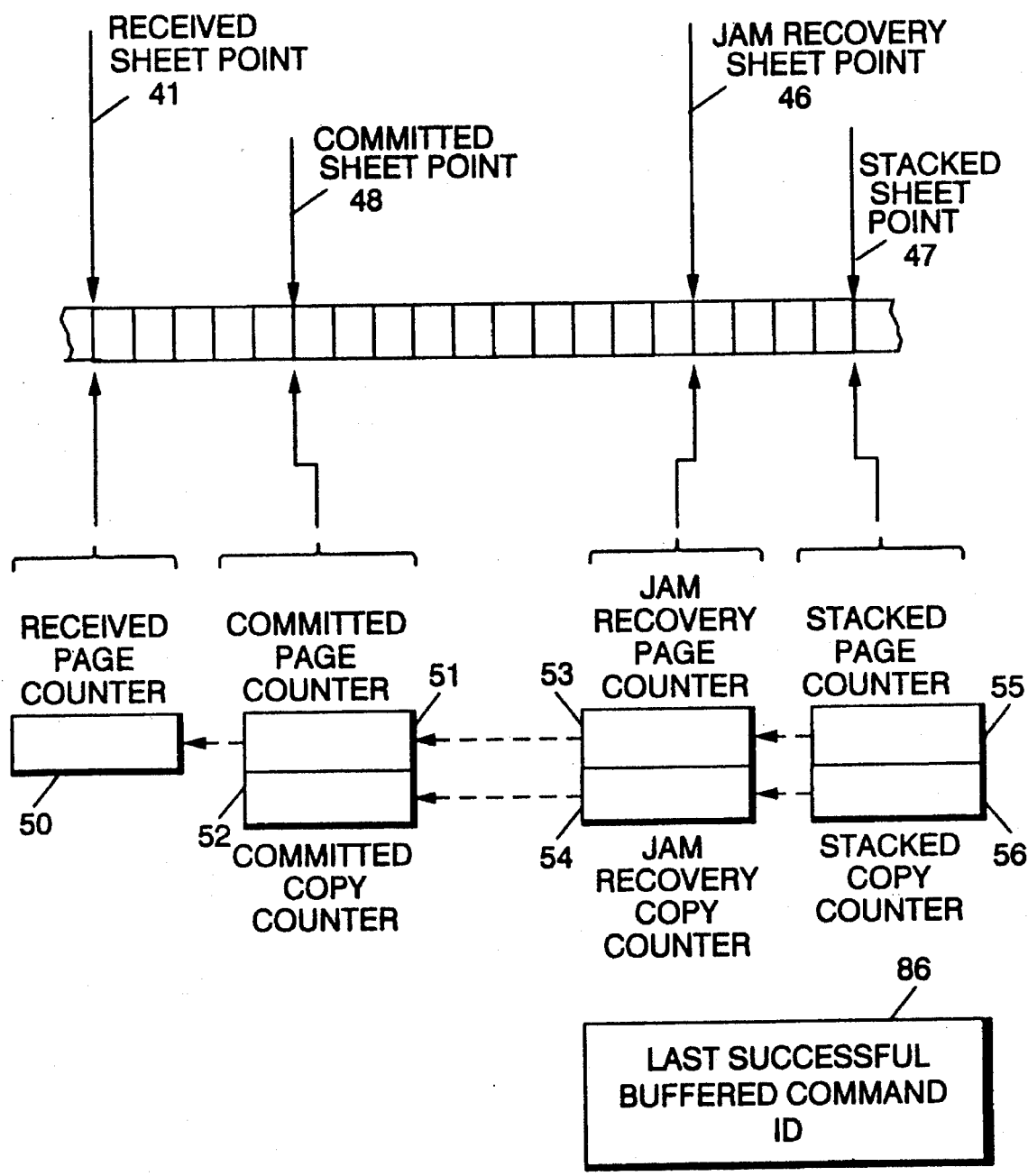
FIG. 10 shows the sheet tracking pipeline of FIG. 4, shows the counting locations of the various page and copy counters of FIG. 1, and shows storing of the last successful buffered command ID.

FIG. 10 is another showing of the sheet tracking pipeline of FIG. 4. FIG. 10 shows that a received page counter 50 is associated with received sheet point 41, that a committed page counter 51 and a committed copy counter 52 are associated with committed sheet point 48, that a jam recovery page counter 53 and a jam recovery copy counter 54 are associated with jam recovery sheet point 46, and that a stacked page counter 55 and a stacked copy counter 56 are associated with stacked sheet point 47. The terms page, sheet, and copy are used in the following sense. As is well known in the art, a sheet generally comprises one physical sheet of paper. One side (simplex) or both sides (duplex) of each sheet may be printed by the use of one or more pages of image data, and printer engine 12 of FIG. 1 may be requested to print more than one physical copy of each sheet. For example, a simplex printed sheet may contain a left-hand column and a right-hand column, and this two column sheet may be formed from two pages of data, one page of data for each column, and printer engine 12 may be requested to print three identical copies of the simplex sheet.

Figure 3:
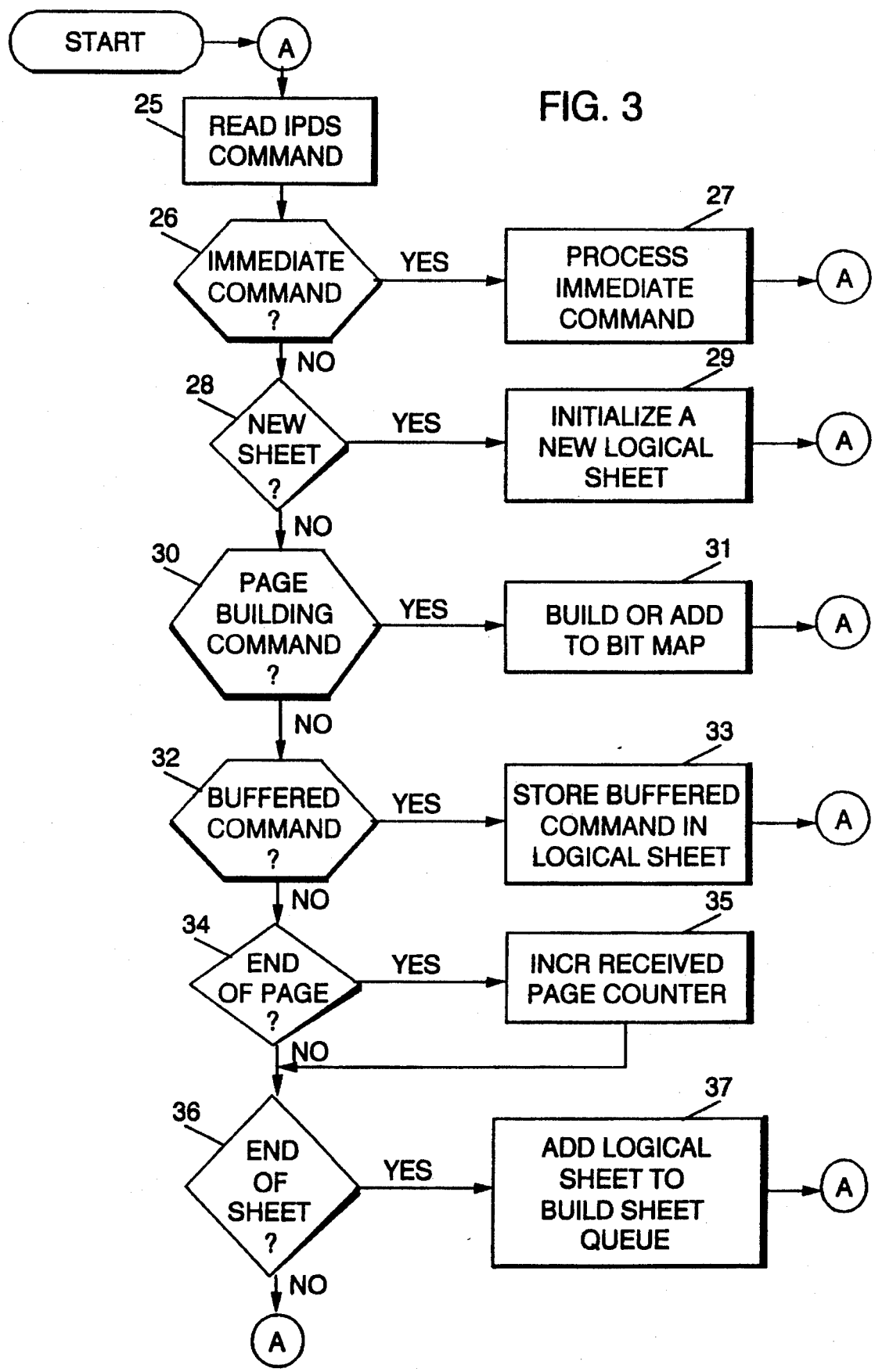
FIG. 3 shows the process by which the build sheet function of the printer controller of FIG. 1 builds the logical sheet of FIG. 2A from the IPDS commands of FIG. 1, and then adds this logical sheet to the build sheet queue of FIG. 1.

As stated previously, build sheet function/device 17 operates to build logical sheets of the type shown in FIG. 2A from IPDS commands 16, and then places these logical sheets in build sheet queue 18. FIG. 3 shows the process by which the build sheet function 17 of printer controller 11 of FIG. 1 builds logical sheets 19,20,21 from IPDS commands 16, and then adds these logical sheets to build sheet queue 18. The process of building a logical sheet is initiated at function box 25 whereat an IPDS command 16 is read.

Decision box now 26 reads command 25, and determines if command 25 is an immediate command; i.e., the well-known IPDS commands that are executed immediately and then discarded. If command 25 is an immediate command, it is executed or processed at 27, and the process of FIG. 3 returns to 25 to read the next IPDS command.

If command 25 is not an immediate command, decision box 28 determines if a new logical sheet is to be formed; i.e., determines if IPDS command 25 is a request to form a new sheet. If a new logical sheet is to be formed, box 29 operates to initialize the formation of a new logical sheet, such as 19,20,21 of FIG. 1, and the process of FIG. 3 returns to 25 to read the next IPDS command.

If a new sheet is not to be formed, decision box 30 determines if IPDS command 25 is a page building command. If yes, box 31 operates to build a logical page bit map, or to add to an existing bit map of a logical page, and the process of FIG. 3 returns to 25 to read the next IPDS command.

If IPDS command 25 is not a page building command, then decision box 32 operates to determine if IPDS command 25 is a buffered command. If yes, then function box 33 operates to store buffered IPDS command 25 in a logical sheet, as shown at FIG. 2A, and the process of FIG. 3 returns to 25 to read the next IPDS command.

If IPDS command 25 is not a buffered command, then decision box 34 determines if IPDS command 25 was an end of page command. If yes, box 35 operates to increment a received page counter in printer controller 11 of FIG. 1 (to be described).

In either event, the next function to be performed by build sheet function 17 of FIG. 1 is shown by decision box 36 of FIG. 3; i.e., a determination of whether or not all of the pages for the sheet have been received. If yes, then box 37 operates to add a logical sheet to build sheet queue 18 of FIG. 1, and the process of FIG. 3 returns to 25 to read the next IPDS command. If no, the process of FIG. 3 also returns to 25 to read the next IPDS command.

Figure 5:
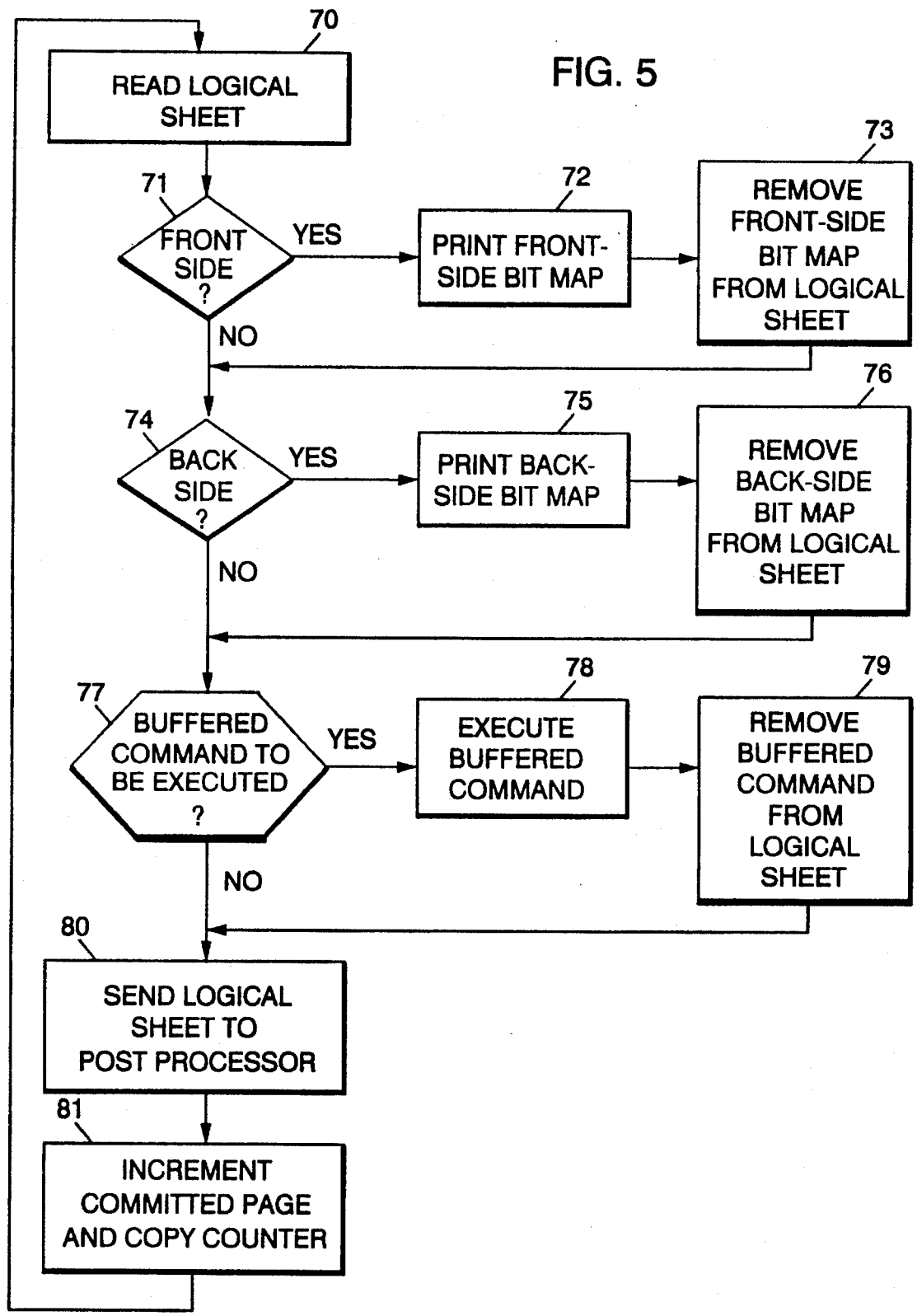
FIG. 5 shows the process by which the printer controller and the print engine of FIG. 1 first processes, and then prints a sheet from the build sheet queue output of the process of FIG. 3.

FIG. 5 shows the process by which printer controller 11 and print engine 12 of FIG. 1 first processes and then prints a sheet from build sheet queue 18 and the output of the process of FIG. 3. The process of FIG. 5 begins at function box 70 when a logical sheet is read from build sheet queue 18. Decision box 71 then determines if the front side of a sheet is to be printed. If yes, then box 72 causes print engine 12 to print the front side of a sheet, using the front side bit map of FIG. 2A. Once this printing job has been accomplished, this front side bit map is removed from the logical sheet at function box 73.

If the output of box 71 is no, or after box 73 has removed the front side bit map from the logical sheet, decision box 74 determines if the back side of a sheet is to be printed. If yes, then box 75 causes print engine 12 to print the back side of a sheet, using the back side bit map of FIG. 2A. Once this printing job has been accomplished, this back side bit map is removed from the logical sheet at function box 76.

If the output of box 74 is no, or after box 76 has removed the back side bit map from the logical sheet, decision box 77 determines if a buffered command, such as from a logical sheet 19 is to be executed. If yes, then box 78 causes the buffered command to be executed, and the buffered command is removed from the logical sheet at function box 79.

If the output of box 77 is no, or after box 79 has removed the buffered command from the logical sheet, box 80 sends the logical sheet from build sheet queue 18 to post processor sheet queue 61, and committed copy counter 52 of FIG. 10 is incremented by the number of pages on the sheet. If this sheet is the last copy, committed copy counter 52 is set to zero, and committed page counter 51 is incremented by the number of pages on the sheet.

The process of FIG. 5 then returns to box 70 to read another logical sheet from build sheet queue 18.

The error recovery principles of the system of FIG. 1 printer system are as defined in the IPDS architecture. The minimum unit of recovery is a copy of a sheet. Recovery is based upon having a serial pipeline of pages that flow through the printer system and, more specifically, to printer controller or control unit 11.

Printer control unit 11 receives responses from post processor controller 13 relative to completed sheets and completed buffered commands and, as a result, printer control unit 11 sends ACKs and NACKs to print system manager 10. Print system manager 10 uses the reception of a NACK to post console messages to assist the operator in jam recovery.

The messages sent by post processor controller 13 to printer control unit 11 relate to completed pages and tag the sheets as completed good or completed with error. Post processor controller 13 may also transmit details of the type of error or failure.

Examples of such messages are;

| message | action code to host | exception ID |
|---|---|---|
| not ready | 03/22 | 4000..00 |
| paper jam | 08 | 40E5..00 |
| status change | 1D | 0104..00 |
| illegal print position | 03/22 | 4012..00 |
| undefined print character | 03/22 | 4012.00 |

When an error has been detected that requires recovery to a jam recovery point, printer control unit 11 issues a command to post processor controller 13 to clear all commands upstream of the jam point. All media upstream of the jam point is removed and discarded; that is, all media must be discarded from the jam point in post processor engine 14 back to, and including, printer 12. Post processor controller 13 sets the jam recovery point as the last point where sheets of paper can be considered good and undamaged sheets.

In post processing machines that perform set boundary operations, the jam recovery point may be the exit point from the operation that is performed at a set boundary. For example, a post processing machine that accumulates sheets to be shrink wrapped waits until the last sheet of a set has arrived and the total set has been successfully shrink wrapped. The post processor withholds all page completed signals until this set is shrink wrapped, and at the end of the shrink wrapping of a good set, the post processor sends a message indicating all pages complete for that set.

The recovery information (i.e., received sheet point 41, committed sheet point 48, jam recovery sheet point 46, and stacked sheet point 47 of FIGS. 1 and 4) is reported by synchronize error recovery function or device 85 of the printer system. Recovered pages and buffered commands are serially resent to the printer system from this jam recovery point.

In accordance with the invention, synchronize error recovery device 85 reports three status items; that is (1) the last successfully executed buffered command ID, (2) all counter values for the counters shown in FIG. 10, and (3) the IPDS exception ID or error code that identifies where the recovery point is within the four possible recovery points 41,48,46,47.

Examples of recovery actions, as they are identified by actions codes, are given below.

X'01' For the action code X'01', print system manager 10 issues a message after receiving a negative acknowledgement (NACK) from the printer system, and then print system manager 10 continues. The printer system of FIG. 1, after issuing the NACK, disregards the command that caused the NACK to be generated, and then continues.

X'03' For the action code X'03', a sense code is issued by the printer system. This sense code covers intervention required conditions, as well as in-operation conditions, such as when more than 50 pages are to be stapled and this post processing feature needs operator attention.

X'08' The action code X'08' is provided as a result of the present invention. For the action code X'08', a sense code is issued by the printer system, and print system manager 10 issues a message to the host operator to report a paper jam. The state of the printer system's page and copy counters of FIG. 10, as well as the state of the last successful buffered command ID register 86 of FIGS. 1A and 10, are reported in this sense code. The state of register 86 represents the number of IPDS buffered commands (for example XOH-DGB and XOH-SGO) that have been processed by the printer system from the beginning of an IPDS command dataset 16 up until the time that a jam occurred. Print system manager 10 uses the state of register 86 to determine which buffered commands are to be resent to the printer system during jam recovery.

As stated previously, a typical IPDS command data stream 16 in accordance with the invention that is issued by the print manager 10 is as follows:

$\{_8(_7\ 8_3<_6\ 7_3\ 6_2>_5\ 5_3)_4(_3\ 4_2\ 3_3\ 2_3\ 1_3)_2\}_1\ Op_(\ Op_<Op_($ wherein the notation $4_2$ indicates that page 4 has 2 copies, the notations $\{(<>)\}$ indicate group boundaries of the data set, the notation $\{_8$ indicates that this is the eighth buffered command in the dataset, and the notations $Op_(, Op_<,$ and $Op_($ indicate group operations that are requested in the data set.

and shown in FIG. 10, jam recovery is controlled by the state of page counters 50,51,53,55, the state of copy counters 52,54,56, and the state of buffered command register 86. Examples will now be given of counter and register conditions at the time that a jam occurs in the printer system when the printer system has received the above exemplary IPDS data stream 16 from print manager 10.

Page counter=0, Copy counter=0, buffered command register=0

In this case, print system manager will resend the entire IPDS data stream.

Page counter=3, Copy counter=1, buffered command register=2

In this case, the counters indicate that all copies of page 3 and one copy of page 4 have cleared the jam recovery point. The following IPDS commands will now be resent to the printer system:

$\{_8(_7\ 8_3<_6\ 7_3\ 6_2>_5\ 5_3)_4(_3\ 4_1$

Page counter=4, Copy counter=0, buffered command register=2

In this case, the counters indicate that all copies of page 4 and no copies of page 5 have cleared the jam recovery point. Print system manager 10 will now resend the following IPDS commands to the printer system:

$\{_8(_7\ 8_3<_6\ 7_3\ 6_2>_5\ 5_3)_4(_3$

Page counter=4, Copy counter=0, buffered command register=3

In this case, the counters indicate that all copies of page 4 and no copies of page 5 have cleared the jam recovery point. Print system manager 10 will now resend the following IPDS commands to the printer system:

$\{_8(_7\ 8_3<_6\ 7_3\ 6_2>_5\ 5_3)_4$

Page counter=4, Copy counter=0, buffered command register=4

In this case, the counters indicate that all copies of page 4 and no copies of page 5 have cleared the jam recovery point. Print system manager 10 will now resend the following IPDS commands to the printer system:

$\{_8(_7\ 8_3<_6\ 7_3\ 6_2>_5\ 5_3$

Page counter=4, Copy counter=2, buffered command register=2

In this case, the counters indicate that all copies of page 4 and two copies of page 5 have cleared the jam recovery point. Print system manager 10 will now resend the following IPDS commands to the printer system:

$\{_8(_7\ 8_3<_6\ 7_3\ 6_2>_5\ 5_1)\ _4(_3$

Note that this situation should not happen since if 2 copies of page 5 were processed successfully, the buffered command register should be at 4 as is shown in the next example. However, print system manager 10 will not attempt to readjust the buffered command register.

Page counter=4, Copy counter=2, buffered command register=4

In this case, the counters indicate that all copies of page 4 and two copies of page 5 have cleared the jam recovery point. Print system manager 10 will now resend the following IPDS commands to the printer system:

$\{_8(_7\ 8_3<_6\ 7_3\ 6_2>_5\ 5_1$

Page counter=8, Copy counter=0, buffered command register=6

In this case, the counters indicate that all copies of page 8 have cleared the jam recovery point. Print system manager 10 will now resend the following IPDS commands to the printer system:

$\{_8(_7$

Page counter=8, Copy counter=0, buffered command register=7

In this case, the counters indicate that all copies of page 8 have cleared the jam recovery point. Print system manager 10 will now resend the following IPDS commands to the printer system:

$\{_8$

A second example will now be given using an insert command (I) that causes the buffered command register to increment, using an eject to front facing IPDS immediate command (E) that is not a buffered command, and wherein A, B and C are sheets to be inserted by the printing system and, therefore, no page or copy counters correspond thereto:

$8_2\{_{10}\ 7_2<_9\ 6_2\ C\ I_8>_7\ Op_<(_6\ 5_2\ B\ E)_5(_4\ 4_2\ A\ I_3)_2\ 3_2\ 2_2\}_1\ 1_2\ OP_(OP_{\{}$

Examples will now be given of counter conditions for this second IPDS data stream at the time that a jam occurs in the printer system when the printer system has received this second exemplary IPDS data stream 16.

Page counter=3, Copy counter=0, buffered command register=1

In this case, the counters indicate that all copies of page 3 and no copies of page 4 have cleared the jam recovery point. Print system manager 10 will now resend the following IPDS data stream to the printer system:

$8_2\{_{10}\ 7_2<_9\ 6_2\ I_8>_7\ Op_<(_6\ 5_2\ E)_5(_4\ 4_2\ I_3)_2$

Page counter=3, Copy counter=0, buffered command register=2

In this case, the counters indicate that all copies of page 3 and no copies of page 4 have cleared the jam recovery point. Print system manager 10 will now resend the following IPDS data stream to the printer system:

$8_2\{_{10}\ 7_2<_9\ 6_2\ I_8>_7\ Op_<(_6\ 5_2\ E)_5(_4\ 4_2\ I_3$

Page counter=3, Copy counter=1, buffered command register=2

In this case, the counters indicate that all copies of page 3 and one copy of page 4 have cleared the jam recovery point. Print system manager 10 will now resend the following IPDS data stream to the printer system:

$8_2\{_{10}\ 7_2<_9\ 6_2\ I_8>_7\ Op_<(_6\ 5_2\ E)_5(_4\ 4_1\ I_3$

Note that this situation should not happen since if 1 copy of page 4 has been processed successfully, the buffered command register should be at 3. However, print system manager 10 will not attempt to readjust the buffered command register.

Page counter=4, Copy counter=0, buffered command register=3

In this case, the counters indicate that all copies of page 4 and no copies of page 5 have cleared the jam recovery point. Print system manager 10 will now resend the following IPDS data stream to the printer system:

$8_2\{_{10}\ 7_2<_9\ 6_2\ I_8>_7\ Op_<(_6\ 5_2\ E)_5(_4$

Page counter=4, Copy counter=0, buffered command register=5

In this case, the counters indicate that all copies of page 4 and no copies of page 5 have cleared the Jam recovery point. Print system manager 10 will now resend the following IPDS data stream to the printer system:

$8_2\{_{10}\ 7_2<_9\ 6_2\ I_8>_7\ Op_<(_6\ 5_2\ E$

Page counter=4, Copy counter=1, buffered command register=5

In this case, the counters indicate that all copies of page 4 and one copy of page 5 have cleared the jam recovery point. Print system manager 10 will now resend the following IPDS data stream to the printer system:

$8_2\{_{10}\ 7_2<_9\ 6_2\ I_8>_7\ Op_<(_6\ 5_1$

Figure 6B:
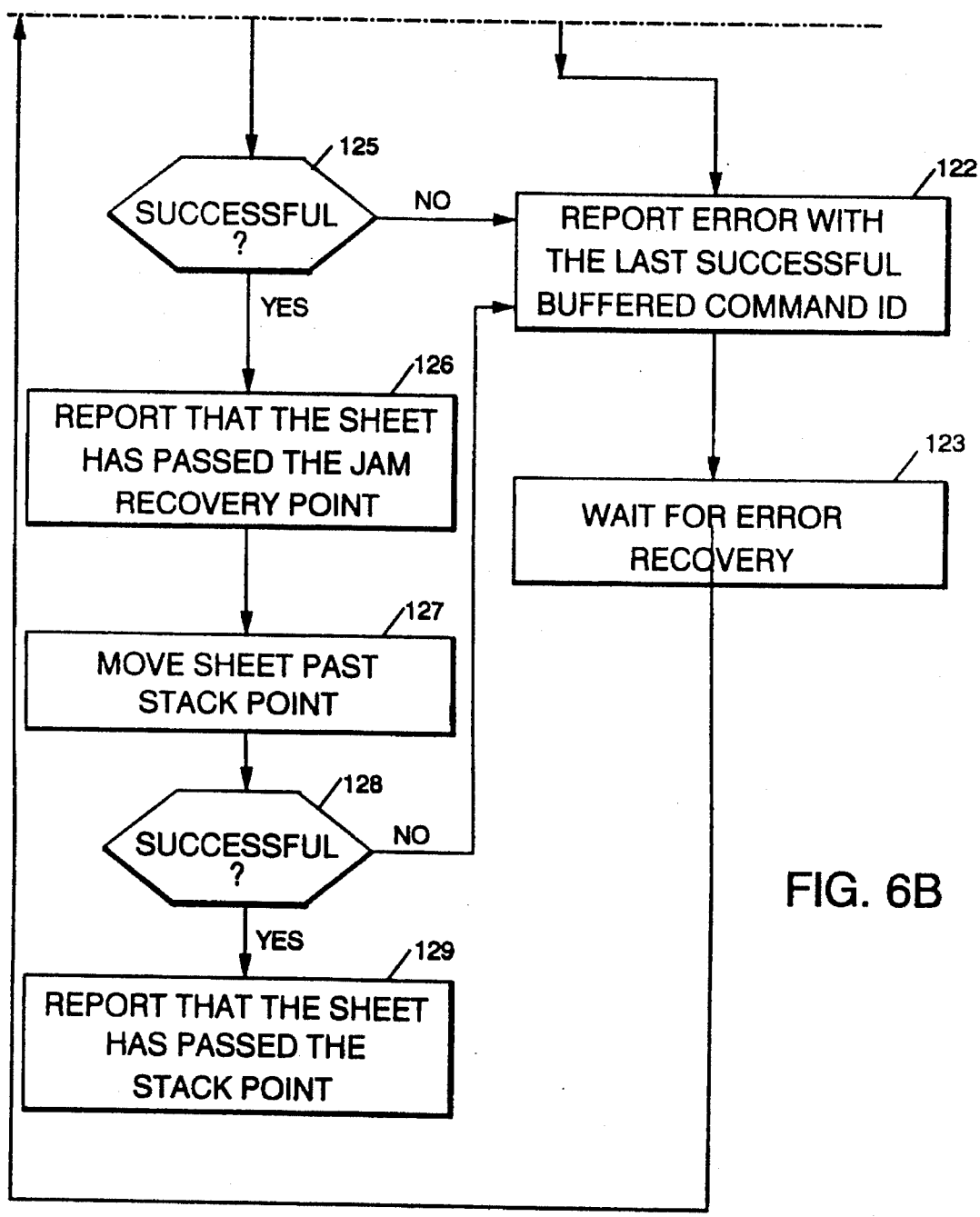
FIG. 6 comprises FIGS. 6A and 6B and shows the work flow of the post processor controller of FIG. 1.

FIG. 6 comprises FIGS. 6A and 6B, and shows the work flow of post processor controller 13 of FIG. 1. At box 115, register 86 of FIGS. 1B and 11 is cleared as an initialization step. Post processor controller 13 now reads a logical sheet from post processor sheet queue 61, as indicated at box 116. If this logical sheet contains an IPDS buffered command, such as is indicated in FIG. 2A, then box 117 causes the buffered command to be executed at 118.

Assuming that the logical page read at 116 did contain a buffered command, then decision box 119 determines if the buffered command was successfully executed by operation of box 118. If it was, then box 120 operates to set the ID of this executed buffered command in register 86 to identify the last successfully executed buffered command, box 121 removes that buffered command from the post processor logical sheet that was read in box 116, and the work flow of post processor controller 13 returns to box 117 to determine if the logical sheet of 116 contains another buffered command to be executed.

In the event that the buffered command was not executed successfully, then decision box 119 causes box 122 to report to synchronize error and recovery means 85 an error using the content of register 86 to identify the last successfully executed buffered command, whereupon box 123 is enabled to wait for recovery from the error. After error recovery has been accomplished, the work flow of post processor controller 13 returns to box 116.

In the event that the logical sheet read by box 116 did not contain a buffered command, then decision box 117 operates to enable box 124, and the sheet is moved past jam recovery point 46 of FIGS. 1B and 10. Decision box 125 then determines if the operation of box 124 was successful. If the answer is no, then decision box 125 causes box 122 to report an error using the content of register 86 to identify the last successfully executed buffered command, whereupon box 123 is enabled to wait for recovery from the error.

When the operation of box 124 is successful, then box 126 operates to report to sheet tracking means 40 that the sheet has moved passed jam recovery point 46, and box 127 operates to move the sheet past stack point 47 of FIGS. 1B and 10. Decision box 128 now operates to determine if the sheet movement of box 127 was successful. If no, then decision box 128 causes box 122 to report an error using the content of register 86 to identify the last successfully executed buffered command, whereupon box 123 is enabled to wait for recovery from the error.

If the sheet movement of box 126 was successful, then box 129 reports to sheet tracking means 40 that the sheet has passed stack point 47.

Figure 8:
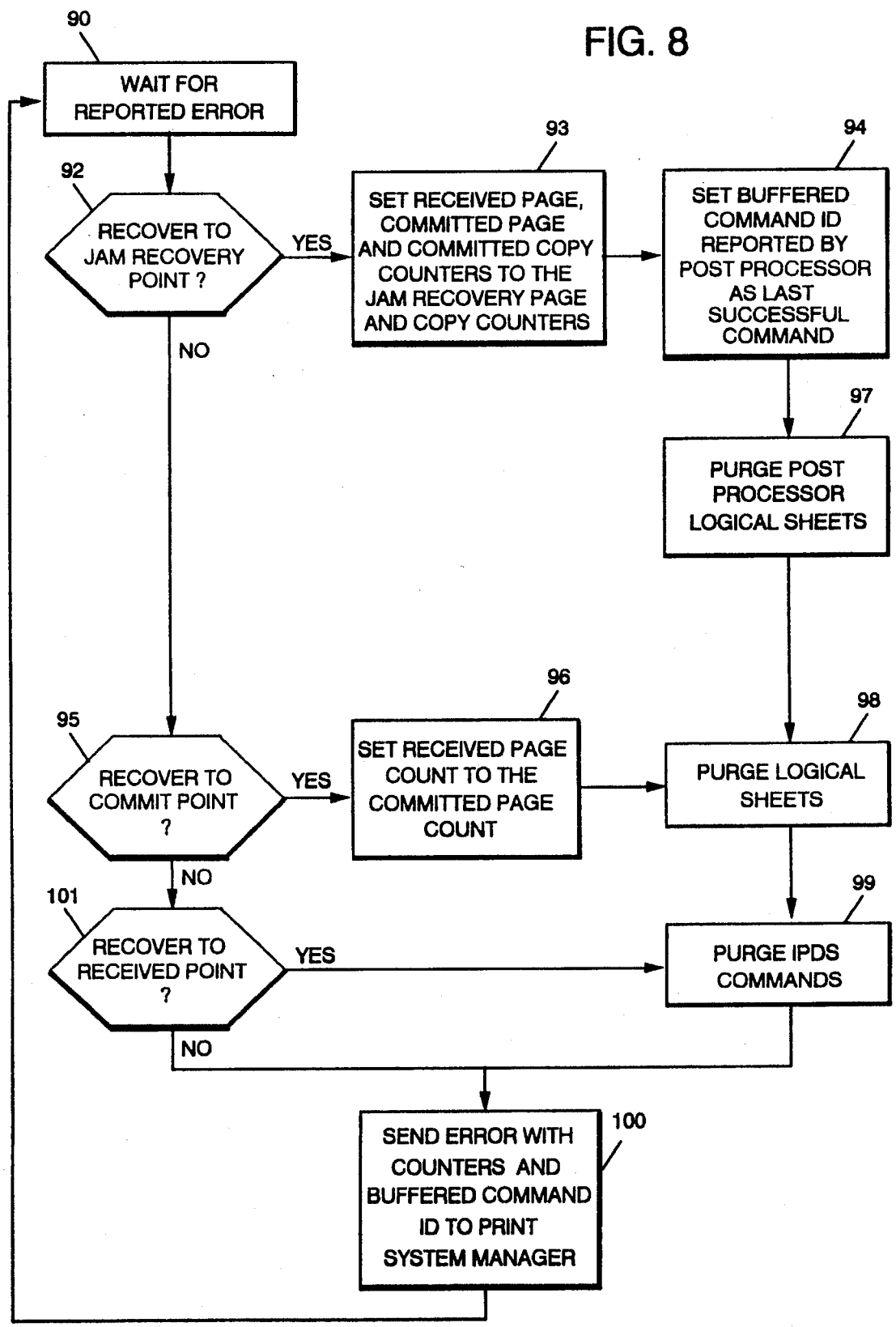
FIG. 8 shows the error recovery work flow that is provided by the synchronize error recovery function of FIG. 1.

FIG. 8 shows the error recovery work flow that is provided by the synchronize error recovery function 85 of FIG. 1. As indicated by box 90, synchronize error recovery function 85 of FIG. 1 waits for any errors to be reported to it by way of input bus 91. Once an error is reported, decision box 92 determines if error recovery is to be made to jam recovery sheet point 46 of FIGS. 1 and 4. If yes, then box 93 operates to set received page counter 50 and committed page counter 51 to the value within jam recovery page counter 53, and box 93 also operates to set committed copy counter 52 to the value within jam recovery copy counter 56. Also, at this time, box 94 operates to set the buffered command ID in register 86 that is to be reported to synchronize error recovery network 85 as the last buffered command to be successfully executed. Box 97 then purges post processor logical sheet queue 61 of its content, box 98 purges the logical sheets from build sheet queue 18, and box 99 purges IPDS commands 16. Box 100 then sends an error message, comprising the content of register 85, all counter values, and the IPDS exception code that identifies the error location as jam recovery point 46, to print system manager 10 by operation of synchronize error recovery function 85.

If recovery is not to be made to jam sheet recovery point 46, then box 95 determines if error recovery is to be made to committed sheet point 48 of FIGS. 1 and 4. If yes, then box 96 sets received page counter 50 to be equal to committed page counter 51, box 98 purges the logical sheets from build sheet queue 18, and box 99 purges IPDS commands 16. Box 100 then sends the error message to print system manager 10 by operation of synchronize error recovery function 85. In this case, identification of the last successful buffered command is contained in last buffered successful command ID register 86.

If recovery is not to be made to committed sheet point 48, then box 101 determines if error recovery is to be made to received sheet point 41 of FIGS. 1 and 4. If yes, then box 99 purges IPDS commands 16. Box 100 then sends the error message to print system manager 10 by operation of synchronize error recovery function 85. Again, identification of the last successful buffered command is contained in last buffered successful command ID register 86.

Figure 9:
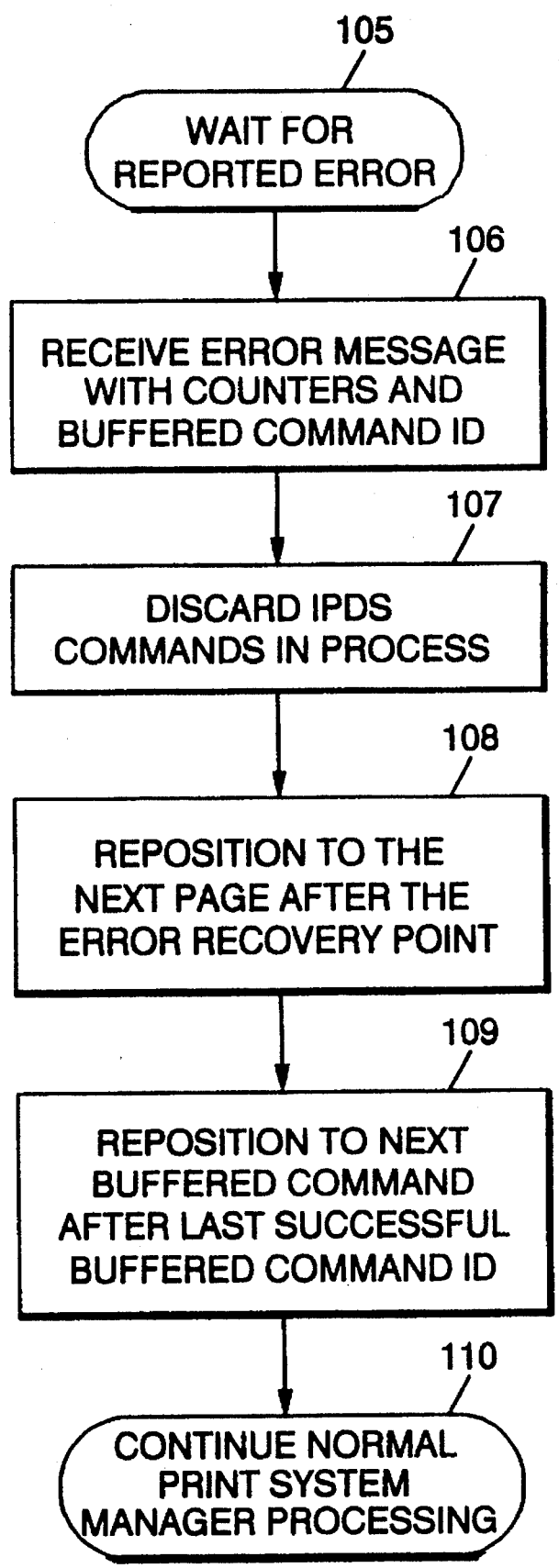
FIG. 9 shows the error recovery work flow that is provided in the print system manager of FIG. 1 as a result of the output that is provided to the print system manager by FIG. 8.

FIG. 9 shows the error recovery work flow that is provided in print system manager 10 of FIG. 1 as a result of the output that is provided by synchronize error recovery function 85. Box 105 first awaits the report of a need for error recovery by synchronize error recovery function 85. When such a need is sensed, print system manager 10 receives the error message as indicated at box 106. Box 107 then operates to discard, or purge, all IPDS commands that are in the process of being assembled from AFP data 15.

Box 108 then operates to reposition the IPDS assembly work point of print system manager 10 in AFP data 15 to the next page after the error recovery point. That is, if the error recovery point is committed sheet point 48 of FIGS. 1 and 4, then print system manager begins assembling IPDS commands 16 so as to provide for the printing of the next page after the last page that successfully passed committed sheet point 48. Print system manager 10 also operates to account for copy sheets that were successfully processed.

Box 109 then operates to reposition to the next buffered command after the last successfully executed buffered command, as indicated by register 85.

Thereafter, print system manager 10 continues normal processing of AFP data 15, thereby reassembling IPDS commands 16 in a manner to effect error recovery.

The above-mentioned second example having IPDS insert command (I), eject to front facing IPDS immediate command (E), and wherein A, B and C indicates that sheets are to be inserted by the printing system is repeated below.

$8_2\{_{10}\ 7_2 <_9\ 6_2\ C\ I_8 >_7\ Op_<(_6\ 5_2\ B\ E)_5(_4\ 4_2\ A\ I_3)_2\ 3_2\ 2_2\}_1$
$1_2\ OP_<OP_{55}$

The above IPDS command stream 16 of FIG. 1A is presented to printer controller 11. Printer commands, such as "$5_2$," and post-printer buffered commands, such as "I", are nested in this IPDS command stream. The printer commands in this command stream generally bound a group of pages, and the group of pages contain one or more page data blocks. The post-printer buffered commands define one or more operations to be performed on sheets that are printed from the page data blocks. The page data blocks are processed in the printer controller or processor, and the groups of pages are printed on sheets in accordance with the printer commands that are contained in this IPDS command stream. Post processor buffered commands are buffered in sheet queue 61 of FIG. 1B as the printer processor processes the page data blocks. Printed sheets from the printer processor are merged with the buffered commands, and the printed sheets are then processed responsive to these buffered commands, to perform post-printer processing of the printed sheets in accordance with the buffered commands. A memory 86 of a last successfully executed buffered post-printer command is maintained. Upon an error being detected in the printing system, the nested printer commands and buffered post-printer commands are resent to the printing system in accordance with the last successfully executed buffered post-printer command.

The invention has been described in detail above by making reference to preferred embodiments thereof. However, it is known that those skilled in the art will, upon reading this detailed description, readily visualize yet other embodiments that are within the spirit and scope of this invention. Thus, it is intended that the above detailed description not be taken as a limitation on the spirit and scope of the invention.

What is claimed is:

1. In a printing system having a printer processor for producing printed sheets, and having a post-printer processor for post-processing said printed sheets, a method for controlling said printer processor and said post-printer processor, comprising the steps of:

nesting printer commands and post-printer commands in a print data stream to said printer processor in said printing system, said printer commands bounding a group of pages in said print data stream, said group of pages containing one or more page data blocks, and said post-printer commands defining one or more operations to be performed on said printed sheets that are printed from said page data blocks, processing in said printer processor said page data blocks and printing said group of pages on said printed sheets in accordance with said printer commands in said print data stream, synchronously buffering said post-printer commands in said printer processor as said printer processor processes said page data blocks, thereby creating buffered post-printer commands corresponding to said printed sheets, merging said printed sheets from said printer processor with said buffered post-printer commands for said post-printer processor and passing said printed sheets and said buffered post-printer commands to said post-printer processor, processing said printed sheets by said post-printer processor responsive to said buffered post-printer commands to perform post-printer processing of said printed sheets in accordance with said buffered post-printer commands, maintaining a memory in said post-printer processor of a last successfully executed buffered post-printer command, and upon an error being detected in said printing system, resending said print data stream to said printing system in accordance with said last successfully executed printer command and buffered post-printer command.

2. The method of claim 1 further comprising the steps of:

maintaining a memory of said page data blocks that have been successfully printed, and upon an error being detected in said printing system, resending said print data stream to said printing system in accordance with said memory of page data blocks that have been successfully printed.

3. In a printing system having a printer for producing printed sheets, and having a post-printer processor for post-processing said printed sheets, a method for controlling said printer and said post-printer processor, comprising the steps of;

nesting printer commands and post-printer commands in a print data stream to said printer processor in said printing system, forming a logical sheet pipeline from said print data stream, said logical sheet pipeline including logical sheets that comprise bit maps and buffered commands, forming a build sheet queue as a portion of said logical sheet pipeline, sending said bit maps from said build sheet queue to said printer, sending said buffered commands from said build sheet queue to a post-processor logical sheet pipeline, forming a post-processor sheet queue as a portion of said post-processor logical sheet pipeline, processing in said printer said bit maps and printing said printed sheets in accordance therewith, merging said printed sheets from said printer with logical sheets from said post-processor sheet queue for post-processing said printed sheets in accordance with said post-printer commands in said post-printer processor, maintaining a memory of a last successfully executed post-printer command, and upon an error being detected in said printing system, resending said print data stream to said printing system in accordance with said last successfully executed post-printer command.

4. The method of claim 3 further comprising the steps of;

maintaining a memory of bit maps that have been successfully printed, and upon an error being detected in said printing system, resending said print data stream to said printing system in accordance with said memory of bit maps that have been successfully printed.

5. In a printing system having a printer for producing printed sheets, and having a post-printer processor for post-processing said printed sheets, a method for controlling said printer and said post-printer processor, comprising the steps of:

nesting printer commands and post-printer commands in a print data stream to said printer processor in said printing system, forming a logical sheet pipeline from said print data stream, said logical sheet pipeline including logical sheets that comprise bit maps and buffered commands, forming a plurality of sheet points in said logical sheet pipeline so as to divide said logical sheet pipeline into a plurality of sections extending from a received sheet point at the beginning of said logical sheet pipeline, to a stacked sheet point at the end of said logical sheet pipeline, forming a build sheet queue as a portion of said logical sheet pipeline immediately after said received sheet point, sending said bit maps from said build sheet queue to said printer, sending said buffered commands from said build sheet queue to a post-processor logical sheet pipeline, forming a post-processor sheet queue as a portion of said post-processor logical sheet pipeline immediately prior to said post-printer processor, processing in said printer said bit maps and printing said printed sheets in accordance therewith, and merging said printed sheets from said printer with logical sheets from said post-processor sheet queue for post-processing said printed sheets in accordance with said post-printer commands in said post-printer processor, maintaining a count of the progress of printing relative to said plurality of sheet points, maintaining a memory of a last successfully executed post-printer command, and upon an error being detected in said printing system, resending said print data stream to said printing system in accordance with said count of the progress of printing and said last successfully executed post-printer command.

6. An apparatus for printing sheets electrically defined by a data stream having bit map images, print commands, and post-print commands, the apparatus comprising:

a printer processor responsive to said print commands and said bit map images, a post-printer processor responsive to said post-print commands, a sheet tracking pipeline transmitting said data stream between said processors and synchronizing the processing of said sheets from said printer processor to said post-printer processor by tracking completion of said print commands and said post-print commands;

said sheet tracking pipeline having a plurality of sheet points in said sheet tracking pipeline so as to divide said sheet tracking pipeline into a plurality of sections extending from a received sheet point at the beginning of said sheet tracking pipeline, to a stacked sheet point at the end of said sheet tracking pipeline, thereby tracking the sheets through said printer processor and said post-printer processor;

a memory in said post-printer processor storing a last successfully executed post-print command so that if an error is detected said print data stream is retransmitted from the last successfully executed post-print command stored in said memory.

* * * * *